J. G. DILLAHA.
Velocipede.
No. 93,686.   Patented Aug. 17, 1869.
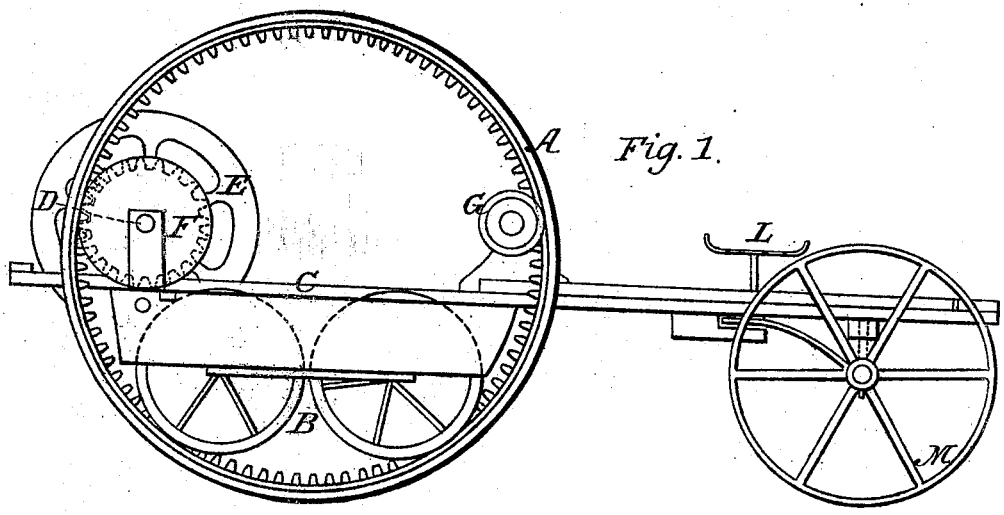
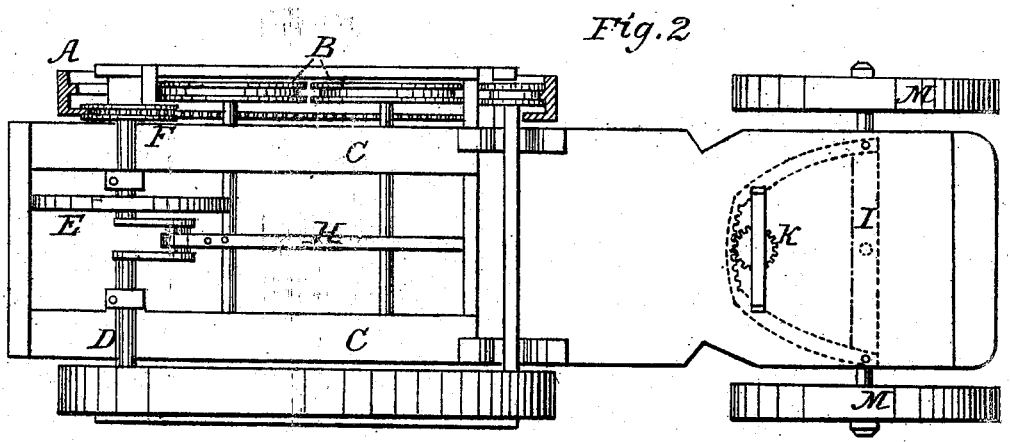
Witnesses
Wm. H. Seaman
Edw. F. Brown
Inventor;
John G. Dellaha
pr. Daniel Breed Atty.

United States Patent Office.

JOHN G. DILLAHA, OF WACO, TEXAS, ASSIGNOR TO HIMSELF, ROBERT M. BOONE, AND NATHAN D. BAILEY, OF CHICAGO, ILLINOIS.

Letters Patent No. 93,686, dated August 17, 1869.

IMPROVED POWER-APPARATUS FOR VEHICLES.

The Schedule referred to in these Letters Patent and making part of the same.

*To all whom it may concern:*

Be it known that I, JOHN G. DILLAHA, of Waco, in the county of McClellan, and State of Texas, have invented a new and useful Improvement in the Application of Power to Vehicles; and I hereby declare that the following is a full and exact description thereof, reference being had to the accompanying drawings, and to the letters of reference marked thereon.

My invention consists of a rim-wheel or wheels, in combination with a truck or trucks, resting upon the inner and lower part of the rim, and supporting a carriage-body or frame, and a crank-shaft, with one or more pinions, and guide-rollers.

In the accompanying drawings—

Figure 1 is a side view of my mode of applying power to vehicles.

Figure 2 is a top view of the same, showing one of the rim-wheels in section.

In the construction of my machine, I make a rim, A, with an internal gear, and also a smooth flange-bearing, A', fig. 2.

Resting on this flange-bearing is a truck, B, which supports one end of the frame C.

Upon the frame is a crank-shaft, D, carrying a balance-wheel, E, and two pinions, F, which engage with the internal gear of the rim A.

The frame also carries the shaft of the guide-rollers G, which bear upon the internal flange of the rim-wheel A.

Now, power being applied to the connecting-rod H, the crank is set in motion, with the fixed pinions F, and thus motion is communicated to the rim A, and to the whole vehicle.

The axle I is pivoted at its centre, and provided with a ratchet, K, and lever L, for steering the vehicle.

The pinions F may be made larger, to increase the speed, or smaller, to increase the power, as desired.

The trucks and guide-pinions are made with double flanges, to keep them on the flange-bearing A', and the truck may be a single wheel, resting near the bottom of the rim-wheel A.

By applying the power to the fore part of the rim A, while the weight rests on the lower part of the rim, the tendency is to lift the weight from the truck B, and throw more or less weight upon the pinion F, and on the front of the rim A, thus employing the power to the greatest advantage.

By the above construction and operation, the rim A is a travelling track for the truck B, which supports the frame C and load.

If desired, the rim A may be applied to all the wheels, instead of letting the wheels M run on the ground, as above represented.

The machine may be moved in either direction.

Having thus described my invention,

I claim—

1. The two rims A A, having the inside flange and teeth, or the equivalent thereof, in combination with the crank-shaft, pinions, and the frame of the vehicle, substantially as herein set forth and described.

2. The combination of the two rims A, the truck, frame, crank-shaft, and pinions, with one or more guide-rollers G, or the equivalents of said devices, substantially as set forth.

3. The last, in combination with the axle I and wheels M, substantially as set forth.

J. G. DILLAHA.

Witnesses:
 A. MOORE,
 DANIEL BREED.